3,062,762
AQUEOUS ADHESIVE COMPOSITION COMPRISING POLYCHLOROPRENE, LUBRICATING OIL, AND POLYSACCHARIDE
Arthur Roland Rice and Frank Nahum Wilder, Louisville, Ky., assignors to E. I. du Pont de Nemours and Company, Wilmington, Del., a corporation of Delaware
No Drawing. Filed Oct. 22, 1959, Ser. No. 847,873
2 Claims. (Cl. 260—17)

This invention is directed to adhesives and more particularly to adhesives to be used to temporarily bond paper surfaces. These novel adhesives have the special property of forming a bond which may be broken without damage to the paper; the paper surfaces bonded together may be flexible, rigid, or both. Thus, paper cartons as well as paper bags can be handled while taking advantage of the unique properties of the novel adhesive compositions of the present invention.

In the modern method of handling, storing, and shipping materials packed in flat paper bags, the filled bags are piled on pallets. In this way they are readily transported by means of fork trucks between warehouses and trailer trucks, railroad cars and other carriers. The bags are usually piled on the pallets in eight or ten layers or higher and must be secured against falling apart, that is, must form a tight, stable, "locked" unit. Since bindings of wire or cord for securing the bags are impractical, adhesives have been investigated. It is obvious, however, that the adhesive must set quickly to a fairly strong bond while allowing the bags to be finally separated without tearing the paper. In addition, the adhesive must have good stability and good flow characteristics so that it may be applied with existing automatic dispensing systems in a uniform manner and in the required pattern to the bags. Furthermore, the bond must retain the desired properties over the whole range of temperatures and humidities to be encountered and the adhesive composition must operate satisfactorily under all existing conditions, including the presence of talc on the bags.

The adhesive compositions of this invention have unexpected properties which are technically antagonistic; that is, both an ability to quickly set to a fairly strong bond while subsequently being readily separated without tearing the paper surfaces bonded together.

It is an object of the present invention to provide a novel adhesive composition, which composition finds significant utility as a temporary bonding agent. It is a further object of this invention to provide a novel adhesive which has unexpected properties which are technically antagonistic. More specifically, it is an object of this invention to provide a novel adhesive composition, which composition sets rapidly to form a bond between paper surfaces and which bond may be readily separated without tearing the respective bonded paper surfaces. These and other objects will become apparent in the following description and claims.

More specifically, the present invention is directed to an adhesive composition comprising (A) 5 to 30 parts by weight of a water-insoluble oil dispersed in a mixture of (B) 5 to 35 parts of an aqueous latex of plastic polychloroprene of 30 to 40% concentration and (C) a 1.5 to 2.5% viscous aqueous solution of polysaccharide derivatives, said polysaccharide derivatives being present in an amount to make a total of 100 parts of said adhesive composition.

The following representative example illustrates the present invention.

*Example*

Seventy parts by weight of a viscous 1.7% aqueous solution of ammonium alginate is added with stirring, by means of propeller type agitator, to 15 parts of a 37.5% latex of a plastic, soluble polychloroprene. Fifteen parts of lubricating oil (refrigerator oil of viscosity C) is then added slowly with stirring which is continued for two hours. A white, creamy, moderately viscous dispersion results.

When applied as an adhesive in strips between bags made of kraft paper and filled with pieces of polychloroprene (neoprene), this adhesive forms a bond in about five minutes which bond keeps piles of the bags securely locked together but which bond can be later broken without tearing the paper. The adhesive may be easily applied in the desired pattern by brushing, rolling, or spreading, or if thinned by water, by spraying. It is stable, that is, it does not separate or change in viscosity on storage. The bond formed is not altered by variations in temperature and humidity which it normally encounters in application or storage. The treated paper is not deteriorated by contact with the adhesive of the present invention.

When the ratio of latex to alginate solution to oil is varied from the 15:70:15 in this example to 15:65:20 and to 20:55:25, the viscosity is decreased and the final bond strength is reduced, further reducing the tendency of the paper to tear but still retaining enough strength to keep the pile of bags stable. In fact, satisfactory results are obtained with 5 to 35% of latex and 5 to 30% of oil, the preferred ranges being 15 to 25 and 10 to 25%, respectively. The latex may contain any of the common types of plastic, soluble polychloroprene, particularly those made by polymerization in the presence of alkyl mercaptans preferably in alkaline solution, and should be of between 30 and 40% concentration, although more and less concentrated latices may be used, of course, if the amount is correspondingly decreased or increased.

The viscous aqueous solution of the polysaccharide derivatives may similarly be other than between 1.5 and 2.5%, provided that the amount of solution used is adjusted.

Examples of other suitable polysaccharide derivatives are pectin, agar and water-soluble cellulose derivatives, such as methyl cellulose and carboxy cellulose. The oil used may be mineral, vegetable, or animal, such as various petroleum base lubricating oils, linseed oil, olive oil, neat's-foot oil and fish oil. The hydrocarbon oils are preferred because they are odorless and not subject to biological attack.

Increasing the proportion of latex relative to the other ingredients increases the bond strength and decreases the viscosity. Increasing the proportion of oil increases the viscosity and reduces the bond strength. Increasing the proportion of the viscous aqueous solution increases the viscosity and, if it replaces oil, increases the bond strength.

These adhesives may be used not only for the specific purpose described above of locking bags together on pallet, but may also be used wherever an adhesive is required for somewhat porous materials such as paper, cardboard, fiberboard, and wood, giving a relatively good bond which, however, may be broken without damage to the surfaces. Thus it may be used for affixing temporary labels for temporary bonding of sheets into books, and for temporarily sealing paper containers.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

We claim:
1. A temporary bonding adhesive composition comprising (a) 5 to 30 parts by weight of a water insoluble petroleum base lubricating oil, said oil being dispersed in a mixture of (b) 5 to 35 parts of an aqueous latex of plastic polychloroprene of 30 to 40% concentration and (c) a 1.5 to 2.5% viscous aqueous solution of a polysaccharide derivative selected from the group consisting of ammonium alginate, pectin, agar and methyl cellulose, to make a total of 100 parts of said adhesive composition.

2. An adhesive composition according to claim 1, said composition containing 10 to 25 parts by weight of said oil and 15 to 25 parts of said latex.

References Cited in the file of this patent

UNITED STATES PATENTS

| | | |
|---|---|---|
| 2,405,724 | Wilder | Aug. 13, 1946 |
| 2,880,184 | Groves et al. | Mar. 31, 1959 |

FOREIGN PATENTS

| | | |
|---|---|---|
| 799,054 | Great Britain | July 30, 1958 |